June 23, 1953  F. A. KROHM  2,642,613
WINDSHIELD WIPER AND ARM CONNECTION
Original Filed March 23, 1950
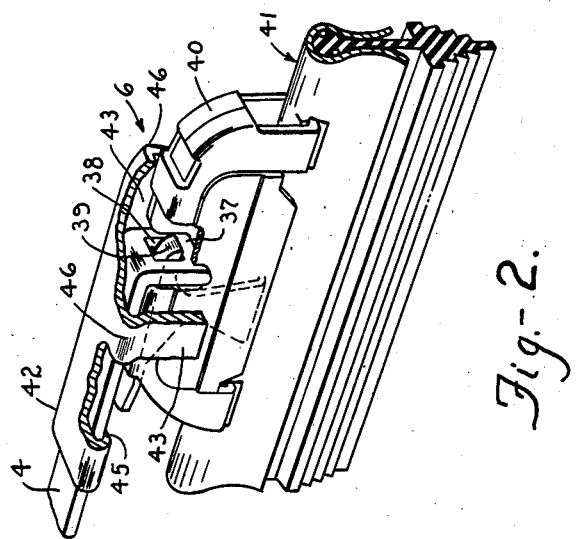
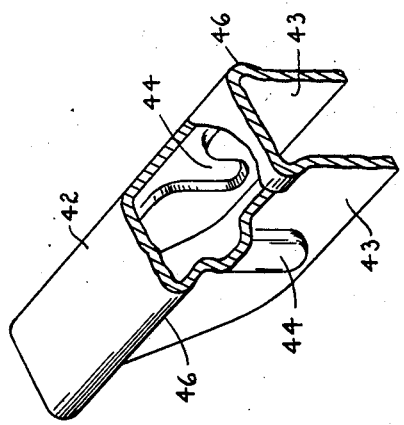
INVENTOR.
FRED A. KROHM
BY
Charles A. Penfold
ATTORNEY Patented June 23, 1953

2,642,613

UNITED STATES PATENT OFFICE 2,642,613

WINDSHIELD WIPER AND ARM CONNECTION

Fred A. Krohm, Gary, Ind., assignor to Productive Inventions, Inc., a corporation of Indiana Original application March 23, 1950, Serial No. 151,503. Divided and this application April 21, 1951, Serial No. 222,269

4 Claims. (Cl. 15—250)

This invention relates generally to windshield wiper arms and more particularly is directed to improved means for detachably connecting a windshield wiper arm to a wiper blade.

More specifically, the invention contemplates providing the free end of a wiper arm with an opening for receiving an entering part or latch carried by a wiper blade.

Another object of the invention is to provide the free end of a wiper arm with an offset and a channel fitting or shroud which is preferably permanently connected to the arm and offset in a manner whereby to eliminate the use of a rivet which is usually employed to secure such a fitting to a wiper arm.

Another object of the invention is to provide a construction consisting of a minimum number of parts, which may be economically manufactured and assembled on a production basis, and when assembled are positive and efficient in action and result.

A further object of the invention is to provide an arrangement which enhances the general appearance or design of a wiper arm.

Other objects and advantages of the invention will become apparent after the description hereinafter set forth is considered in conjunction with the drawings annexed hereto.

In the drawings wherein identical parts are designated by the same numerals:

Figure 1 is a perspective view of a shroud member carried by a free end of a wiper blade carrying section of a wiping arm, with portions of the shroud member being broken away to exemplify details of its construction; and Figure 2 is a perspective view depicting the means for connecting the wiper blade unit to the arm unit, with portions of the means being broken away to illustrate details of its construction.

This application is a division of my copending application Serial No. 151,503, filed March 23, 1950.

The principles of design and construction embodied in the connector 40, latch 39 thereof and the manner of operatively connecting the connector and latch to a wiper blade 41 are being claimed in applicant's co-pending application bearing a filing date of September 25, 1952, and Serial No. 311,425, the latter being a continuation of an earlier application bearing a filing date of January 29, 1946, and Serial No. 644,120.

Referring to the drawings, the wiper arm includes an elongated outer bar section 4 having connector means generally designated 6 provided adjacent its free end.

The free end of the bar section is preferably formed with a right angled or offset substantially square portion 37 having a generally square opening or hole 38 therein, which opening is preferably adapted to receive a spring pressed or yieldable catch or latch 39 constituting a component of a connector 40 carried by a wiper blade generally designated 41 shown in Figure 2.

The connector 40 is preferably of channel construction and is pivotally mounted on the wiper blade 41. More particularly the connector includes a pair of side walls and an outer front wall which are interrupted to provide an opening or entrance-way for receiving the offset end 37 of the arm section 4 as exemplified in Figure 2.

A channel shaped shroud 42 is attached to the arm section about the offset 37. This shroud includes a top wall which bears against the top side of the arm and side walls 43 which straddle the connector 40. Each wall is provided with an outwardly extending depression 44 which forms an internal groove or recess for receiving the side portion of the offset to lock the shroud on the arm. The shroud is also provided with fingers 45 which are clamped against the underside of the arm to assist in locking the shroud to the arm. With this novel arrangement, the use of a rivet customarily employed to hold the shroud to the arm is eliminated and as a consequence the cost of the arm is reduced and its general appearance or design is improved.

It will be noted that the shroud member is further provided with longitudinally extending formations 46 as clearly illustrated and portions of these formations in combination with the depressions 44 provide generally L-shaped recesses or grooves. The arrangement is preferably such that the longitudinal marginal edge portions of the blade carrying section 4 of the wiper arm are received in the longitudinal formations 46 of the shroud member 42.

In view of the foregoing, it will be apparent that to connect the blade to the arm it is merely necessary to insert the offset 37 of the arm into the entrance-way provided in the connector 40 so that the hole 38 in the offset is located substantially within the confines of the connector. The yieldable latch 39 is retracted by the offset as the offset is directed into the entrance-way and when the offset is properly seated or positioned the latch will automatically snap back and enter the hole 38 to detachably connect the blade to the arm. The side walls 43 of the shroud straddle the connector and conceal the detachable connection established between the blade and arm.

Having thus described my invention, it is obvious that various modifications may be made in the same without departing from the spirit of the invention; and, therefore, I do not wish to be understood as limiting myself to the exact form, construction, arrangement, and combination of parts herein shown and described and defined in the claims.

I claim:

1. An outer section of a windshield wiper arm provided with an L-shaped integral portion, said portion having an opening to receive an entering part carried by a blade, a channel member having a base wall and side walls, and each of said side walls having an L-shaped groove portion receiving and clamping against an edge of said integral portion to permanently lock the channel member to the arm section.

2. The structure defined in claim 1, in which the channel member is also provided with integral fingers clamped against the arm section.

3. In combination: a wiper blade unit comprising a resilient wiping element and a support therefor, a connector carried by the blade, said connector comprising a channel provided with an entrance-way, a yieldable latch disposed in the channel and having a locking part, a wiper arm unit having a free end portion provided with a hole, said end portion extending into the entrance-way so that the hole is located substantially within the confines of the channel, and said locking part extending into said hole for connecting the units together.

4. In combination: a wiper blade unit comprising a resilient wiping element and a support therefor, a connector pivotally connected to the blade, said connector comprising a channel provided with an entrance-way, a yieldable latch pivotally mounted in the channel, said latch having a locking part located within the confines of the channel and an extension projecting outwardly from one end of the channel for manual engagement to facilitate operation of the latch, a wiper arm unit having a free offset end portion provided with a hole, said end portion extending into the entrance-way so that the hole is located substantially within the confines of the channel and said locking part extending into said hole for connecting the units together.

FRED A. KROHM.

References Cited in the file of this patent

UNITED STATES PATENTS

| Number | Name | Date |
|---|---|---|
| 1,779,344 | Tarver | Oct. 21, 1930 |
| 2,203,346 | Anderson | June 4, 1940 |
| 2,404,523 | Nesson | July 23, 1946 |
| 2,432,693 | Anderson | Dec. 16, 1947 |